April 16, 1929.  F. A. HAYES  1,709,130
VEHICLE SPRING SUSPENSION
Filed Aug. 16, 1926   2 Sheets-Sheet 1

INVENTOR
FRANK A. HAYES
BY
ATTORNEY

April 16, 1929.  F. A. HAYES  1,709,130
VEHICLE SPRING SUSPENSION
Filed Aug. 16, 1926   2 Sheets-Sheet 2

INVENTOR
FRANK A. HAYES
BY
ATTORNEY

Patented Apr. 16, 1929.

1,709,130

UNITED STATES PATENT OFFICE.

FRANK A. HAYES, OF KEYPORT, NEW JERSEY, ASSIGNOR TO HEALEY-AEROMARINE BUS CO., INC., A CORPORATION OF NEW YORK.

VEHICLE SPRING SUSPENSION.

Application filed August 16, 1926. Serial No. 129,555.

This invention relates to the suspension of motor road vehicles and has for one of its objects the elimination of the torsional or twisting strains imposed upon the body and frame of the conventionally sprung vehicle by uneven road conditions. It is well known that where a vehicle is suspended by means of springs rigidly connected to either the frame or the axle, both front and rear, road conditions such as occur when one wheel rises over a bump or drops into a hole or when the vehicle turns onto a ramp or other incline, produce severe torsional or twisting strains in the body. These twisting strains reach a maximum under conditions sufficiently adverse to cause the whole vehicle weight to be supported on two diagonally opposite wheels.

Provisions have been made in the prior art for ameliorating this condition by imposing cam blocks or other yielding means which reduce these twisting strains somewhat, but the purpose of this invention is to provide means which will entirely relieve these twisting strains by providing complete freedom of rolling or traverse rocking action of the body at one end; the position of the body with reference to roll being determined by a conventional form of spring suspension at the other end.

A further object of the invention is to provide resilient stops which limit this rolling action to a pre-determined amount so that when the roll tends to exceed this amount the stability of the body is maintained by the road contacts at both ends as in conventional spring suspensions.

A further object of the invention is to provide means for readily adjusting the height of the vehicle with reference to the road at the end where the free spring suspension is used.

A further object of the invention is to simplify the adaptation of so-called coil or helical springs for the purpose of vehicle suspension by providing one spring or set of springs reacting on both wheels simultaneously in place of the usual two separate springs or sets of springs, one for each wheel.

Various other objects and advantages of the invention will be apparent from an inspection of the accompanying drawings in which.

Figure 1:
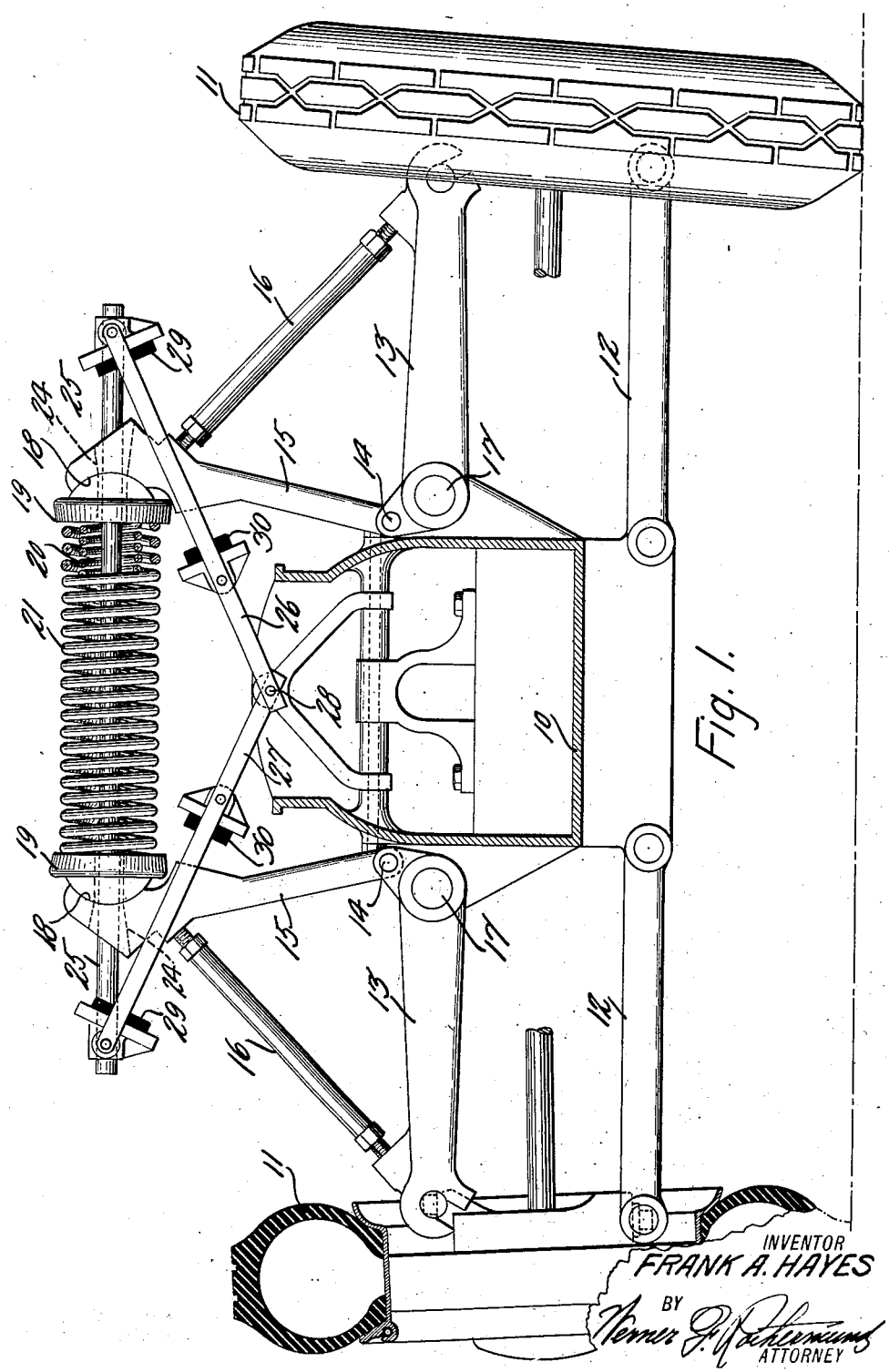
Figure 1 is a cross section of a vehicle illustrating my invention the various elements of which are shown as under normal load and even road conditions.

In the present instance 10 designates the frame or body portion of the vehicle to which the wheels 11 are connected by means of the radius brackets 12, 13 said brackets being adapted to support the vehicle while permitting independent up and down movement of the wheels in relation thereto.

To each of the radius brackets 13 there is pivotally connected at 14 an arm or lever 15, the upper end of which is adjustably connected to the outer end of the bracket 13 by means of a turnbuckle 16 by which the vehicle may be raised or lowered, the foregoing elements forming a rigid triangulated structure which is pivotally connected at 17 to the body 10.

The upper ends of the arms 15 are provided with some form of pin joint connecting them to the spring means. In the preferred form shown in the drawings this pin joint consists of a semi-cylindrical block 18 preferably made of some form of self lubricating material which engages a mating surface in the upper ends of the arms 15. The block 18 bears against the spring cups 19 which engage the ends of the spring or set of springs 20.

A shaft 25 passes through slots 24 in the upper ends of the arms 15 which provide ample clearance for the relative rocking movement of these parts and through sliding bearings in the cups 19 which maintain these cups at right angles to the shaft and provide the vertical support for the said shaft 25. The shaft is held against longitudinal movement by a pin joint connection to the yoke 27, a similar connection being made to the yoke 26 by means of a slot in the shaft which allows a slight sliding action between these parts. The yokes 26, 27 are pivoted to the frame member at 28 and are provided with resilient blocks preferably made of rubber 29 and 30, which limit the movement of the triangulated structures in either direction.

Figure 2:
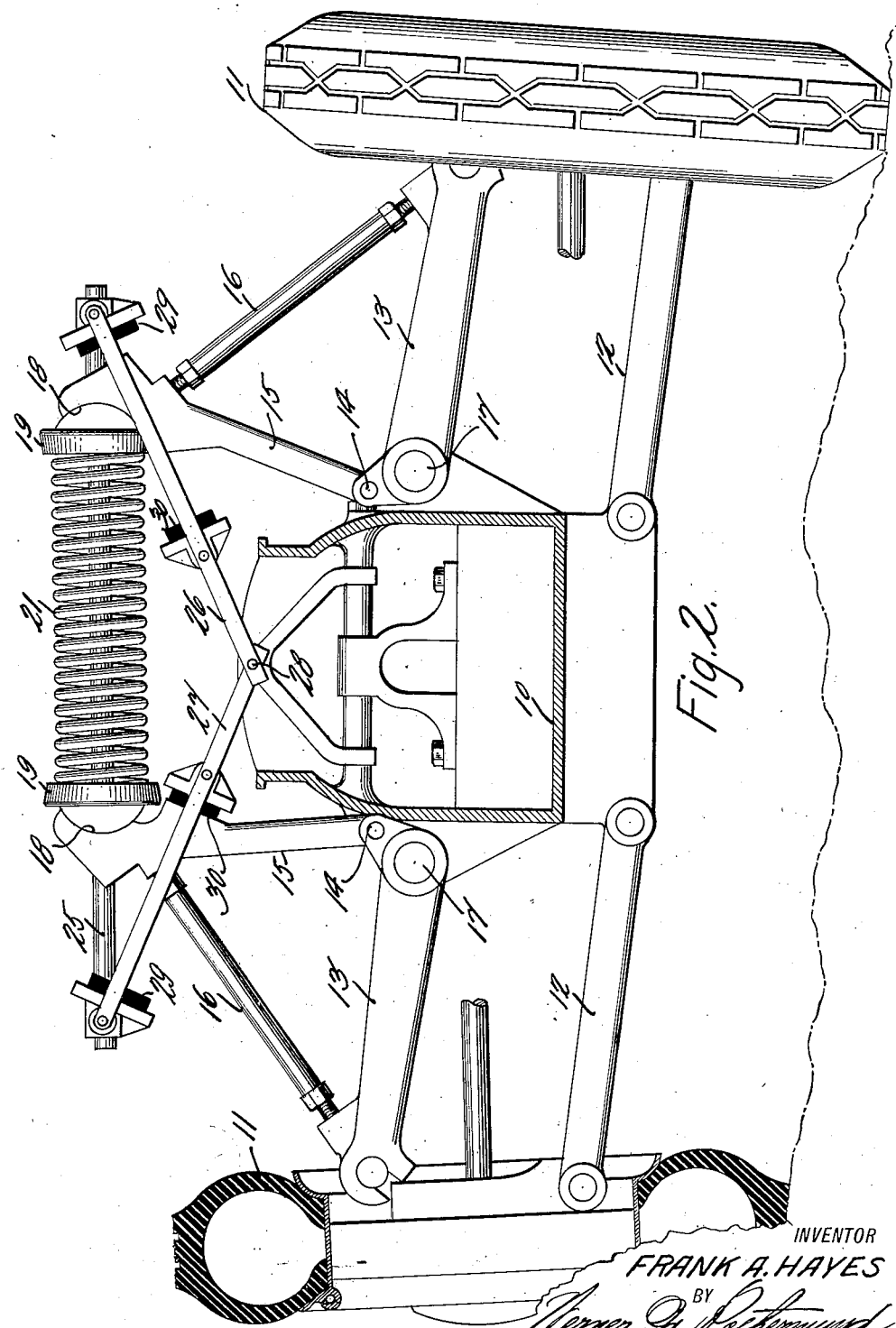
Figure 2 is a view similar to Fig. 1 showing the elements of the invention in a position as under rough or uneven road conditions.

It will be seen in Figure 2 that one of the wheels connected to the vehicle by the suspension described in the present invention may be raised a considerable amount above its normal position (limited only by the aforesaid resilient stops) and the other wheel may drop a considerable distance below its normal position, the tension in the spring meanwhile remaining constant, without producing any effect upon the frame or body which continues to ride in the position determined by the pair of wheels and springs at the opposite end of the body. It will also be seen that the spring or springs 20, 21 are solely supported at their ends by the triangular brackets comprising the members 13, 15 and 16, and that together with their connecting parts, they are free to move transversely of the body without imposing any resulting force thereon.

Although one specific embodiment of the invention has been particularly shown and described, it will be understood that the invention is capable of modification and that changes in the construction and in the arrangement of the various cooperating parts may be made without departing from the spirit or scope of the invention as expressed in the following claims.

Having thus described my invention, I claim:

1. In apparatus of the class described, the combination with a vehicle, of upper and lower radius brackets pivotally connected to either side of the vehicle to operatively support the vehicle wheels, spring means having connection with one of said brackets on either side and adapted for free longitudinal movement by the action of said brackets, and resilient means to limit the spring travel in either direction.

2. In a vehicle, the combination of a frame, a triangulated structure pivotally connected to either side of the frame and operatively supporting a hub portion of the vehicle wheels, spring means disposed between and having connection with said structure on either side, and means to permit angular adjustment of each of said structures so as to raise or lower the vehicle.

3. In a vehicle, the combination of an adjustable structure on either side of the vehicle and pivoted thereto, each structure having connection with a wheel of the vehicle, a spring means disposed between said structures and supported thereby; said spring means being adapted for longitudinal travel transversely of the vehicle and deflectable by the action of either one or both of said structures, and means adapted to limit the travel of said spring in either direction.

4. In apparatus of the class described, the combination with a road vehicle having a frame and wheels connected thereto by vertically flexible radius arms, of a pair of levers each pivoted at one end on either side of the vehicle and actuated by the radius arms, spring means adapted for free longitudinal movement disposed between the free ends of said levers and secured thereto, and means to limit the spring travel in either direction.

5. In apparatus of the class described, the combination with a road vehicle having a frame and wheels connected thereto by vertically yieldable means, of a pair of levers each pivoted at one end on either side of the vehicle and actuated by the yieldable means, spring means adapted for free longitudinal movement disposed between the free ends of said levers and secured thereto, resilient means to limit the spring travel in either direction, and adjusting means to raise or lower the vehicle.

Signed at Keyport, in the county of Monmouth, and State of New Jersey, this 14th day of August A. D. 1926.

FRANK A. HAYES.